United States Patent [19]
Cook et al.

[11] Patent Number: 4,620,255
[45] Date of Patent: Oct. 28, 1986

[54] TAPE CARTRIDGE STATIC ELIMINATOR

[75] Inventors: Randall W. Cook, Palo Alto; Richard E. Rozporka, San Mateo; Robert S. Jones, San Jose, all of Calif.

[73] Assignee: Tandy Corporation, Fort Worth, Tex.

[21] Appl. No.: 629,016

[22] Filed: Jul. 9, 1984

[51] Int. Cl.⁴ .............................................. G11B 23/02
[52] U.S. Cl. ................. 360/132; 360/130.32; 360/130.33; 242/199
[58] Field of Search ................. 360/132, 134, 130.21, 360/130.2, 130.3, 130.31, 130.32, 130.33; 242/199, 198

[56] References Cited

U.S. PATENT DOCUMENTS

| | | | |
|---|---|---|---|
| 3,601,654 | 8/1971 | Long et al. | 360/132 |
| 4,204,654 | 5/1980 | Gebeke | 242/199 |
| 4,285,020 | 8/1981 | Sato | 360/132 |
| 4,335,857 | 1/1982 | Pfost et al. | 242/199 |
| 4,345,284 | 8/1982 | Saito | 360/132 |
| 4,347,549 | 8/1982 | Fechner | 361/212 |
| 4,429,823 | 2/1984 | Umehara | 242/199 |
| 4,509,087 | 4/1985 | Jäger et al. | 242/199 |

FOREIGN PATENT DOCUMENTS

| | | |
|---|---|---|
| 0074032 | 3/1983 | European Pat. Off. . |
| 0074033 | 3/1983 | European Pat. Off. . |
| 0085442 | 8/1983 | European Pat. Off. . |
| 0092275 | 10/1983 | European Pat. Off. . |
| 0097873 | 1/1984 | European Pat. Off. . |
| 53-74415 | 6/1978 | Japan ................. 360/132 |
| 55-135376 | 10/1980 | Japan ................. 360/132 |
| 2114093 | 1/1982 | United Kingdom . |
| 2114954 | 2/1982 | United Kingdom . |

Primary Examiner—John H. Wolff
Assistant Examiner—Alfonso Garcia
Attorney, Agent, or Firm—Townsend & Townsend

[57] ABSTRACT

Static electric charge build-up is eliminated in tape cassettes having a housing with a take-off spool and a take-up spool for magnetic tape mounted in the housing. First and second tape guide support pins are mounted in the housing on the take-off spool side. A stationary metal guide sleeve is disposed on the first pin and an electrically conductive plastic guide roller is rotatably mounted on the second pin. The magnetic tape path through the cassette housing is such that the back side of the tape engages the metal guide sleeve and the magnetic coating side of the tape is against the plastic guide roller. A smooth flat metal member is mounted for electrical contact against adjacent ends of the metal sleeve and the plastic roller to complete an electric path therebetween. This cancels the electrostatic charges on the plastic roller and the magnetic coating of the tape.

5 Claims, 3 Drawing Figures

U.S. Patent   Oct. 28, 1986   4,620,255
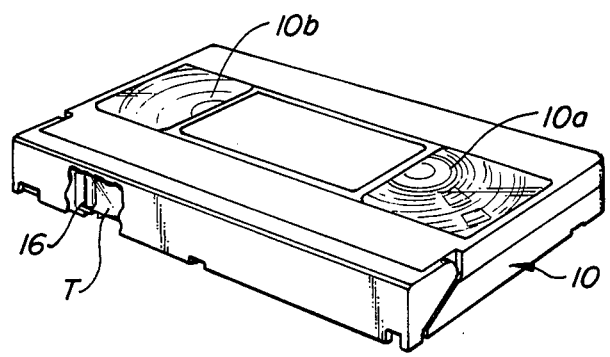
FIG._1.
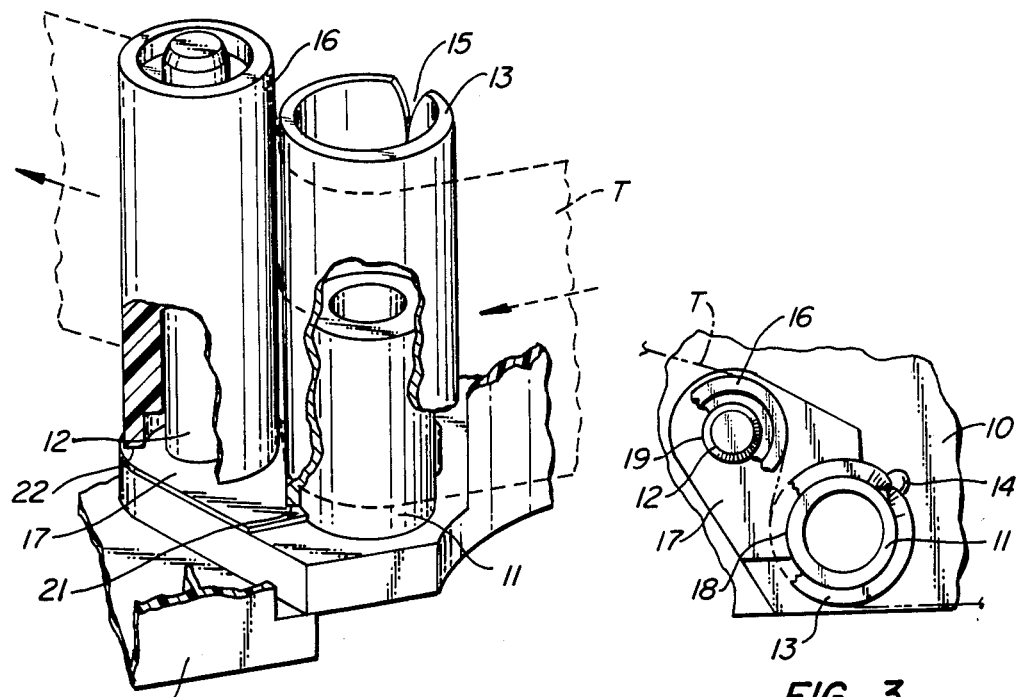
FIG._2.
FIG._3.

TAPE CARTRIDGE STATIC ELIMINATOR

BACKGROUND OF THE INVENTION

This invention relates to magnetic tape cassettes. More particularly, it relates to elimination of the electrostatic charges which build up within the cassette when magnetic tape is transported from reel to reel within the cassette.

During operation of a magnetic tape cartridge static electricity is generated by rubbing of the tape over stationary tape guiding surfaces made of different materials than that of the tape itself. This static electric charge causes two major problems to the operation of the cartridge: (1) Due to differing electrical potentials between them and the tape, dust and debris are attracted to the tape surface. This results in interference with the tape's function by scratching it or causing interference between the tape coating and the recording or playback head resulting in lost or reduced signal transfer (dropouts). (2) The electrical charges generated at the contact areas between the tape and the tape cartridge (such as tape guides) create an electrical potential and thereby cause an electrostatic attraction between the charged materials. This attraction between the tape and the stationary tape guides in the cartridge increases the friction already present to a degree which can result in failure of the tape to run smoothly.

The buildup of electrostatic charges during tape transport within cassettes is well known, and numerous techniques have been devised for discharging the static electricity. Typically, the prior art has provided for electrical connection between the substrate containing the static electric charges to ground such as by connection of the tape and/or cassette to the cassette player unit. Other arrangements have provided for electrically connecting both sides of the magnetic tape to cancel static electric charges. See European patent application No. 0074032, particularly FIG. 2, in which metal straps electrically connect stationary guides for both sides of a magnetic tape.

SUMMARY OF THE INVENTION

The present invention provides means for electrically connecting the magnetic coating of the tape with the back side of the tape to thereby eliminate static electricity. As will be explained, this connection is achieved in a particularly advantageous way.

Accordingly, the present invention provides a tape cassette comprising: a housing containing a takeoff spool and a take-up spool for magnetic tape, first and second tape guide support pins mounted within said cassette on the take-up spool side of said housing, a stationary metal guide sleeve on said first pin, an electrically conductive plastic guide roller rotatably mounted on said second pin, the magnetic tape path through said cassette housing engaging the back side of said tape against said metal sleeve guide and the magnetic coating side of said tape against said plastic guide roller, and a smooth flat metal member mounted for electrical contact against adjacent ends of said metal sleeve and plastic roller to complete an electrical path therebetween and thereby cancel the electrostatic charges generated on said metal guide sleeve and the magnetic coating of said tape during transport of said tape between said take-off and take-up spools.

In the preferred embodiment the flat metal member is formed with an arcuate edge compatible with the surface of said first support pin. The metal member is retained in fixed position by frictional engagement between the metal sleeve and the cassette housing. The metal member also has an aperture through which the second support pin is inserted. The metal member serves as a bearing surface for the plastic roller during rotation about the second pin. This arrangement is particularly advantageous in that the inherent lubricity of the conductive plastic roller and the integrity of the conductive flat metal member reduce or eliminate the wear and subsequent debris generated by prior systems that has limited the useful life of tape and cassettes.

DESCRIPTION OF THE PREFERRED EMBODIMENTS

In the accompanying drawings, FIG. 1 is a perspective of a typical VHS magnetic tape cassette with a portion broken away to show the position of the present improvements in the cassette.

FIG. 2 is a perspective with parts broken away of the support pins with associated guide, roller and metal washer of this invention.

FIG. 3 is a top view of FIG. 2.

With respect to the accompanying drawings, a typical VHS magnetic tape cassette utilized for video recording is shown in FIG. 1. It includes a housing 10 containing a take-off spool 10a and a take-up spool 10b for magnetic tape T. Full details of the tape path within housing 10 is not shown and is conventional and well documented in the art.

Particularly pertinent to the present invention are tape guide support pins 11 and 12 on the take-up spool side of the cassette housing 10. Support pin 11 is frictionally press fitted to restrain against relative movement with metal guide sleeve 13 thereon. Sleeve 13 is thereby retained in an upright stationary position. Insertion of projection 14 within a slot similar to slot 15 but on the opposite end of metal sleeve 13 may be used to assist in holding sleeve 13 in a fixed position. (The top half of housing 10 not shown in FIG. 2 has a generally equivalent relationship with the parts shown in FIG. 2. Optionally, the top half of housing 10 may omit a duplicate of projections 14.) Support pin 12 is attached to housing 10 to receive rotatably mounted plastic guide roller 16 thereon.

Plastic guide roller 16 is made from an electrically conductive polymer. A suitable material for such purpose comprises a polypropylene base filled with carbon black powder available from LNP Corporation, Santa Ana, Calif., under the trademark Stat-Kon $M_1$. Electrically conductive polymeric material is advantageous in that it provides less rotational inertia than metal or other electrically conductive, more dense materials. Such other materials may induce sliding contact which results in scratching of the magnetic coating of the magnetic tape.

An electrically conductive path between metal guide sleeve 13 and plastic guide roller 16 is provided by smooth flat metal member 17. In the preferred embodiment metal member 17 is formed with an arcuate or concave edge 18 and aperture 19. The metal member 17 is frictionally restrained in position by sandwiching between metal sleeve 13 and housing 10 when sleeve 13 is press fitted on pin 11. Pin 12 is inserted through aperture 19. Arcuate edge 18 of member 17 accommodates pin 11 and prevents any substantial relative movement.

Metal member 17 thus functions as a washer or bearing surface for plastic roller 16.

Preferably the metal selected for metal member 17 is sufficiently soft to be formed by machine punching in the substantial absence of burrs. Punch forming is an economically desirable manufacturing technique and the absence of burrs is essential to avoid damage to the tape. The metal should also be hard enough to retain its shape while being press fitted into position with the other cooperating parts thereby also offering an economically attractive assembly technique for the cassette. A suitable metal material for this purpose is phosphor bronze.

An electrical connection between adjacent end 21 of stationary sleeve 13 and end 22 of plastic guide roller 16 is established by the structure shown. This conductive path from the stationary metal guide sleeve 13 through the conductive washer 17 and through the conductive plastic roller 16 electrically connects the magnetic coating side of the tape T and the reverse side thereof. The electrostatic charges are cancelled and smooth transport of the tape within the cassette is promoted, reliably yielding greater accuracy of reproduction.

As a result of the relationship of the cassette parts shown, both the tape and the tape player will last longer due to less friction, lower tension and less stretching to the tape. The tape player benefits from requiring less force to run the tape cartridge. Tape player head wear will be reduced due to relatively lower amounts of abrasive debris being generated during transport of the tape.

We claim:

1. A magnetic tape cassette comprising: a housing containing a take-off spool and a take-up spool for magnetic tape, first and second tape guide support pins mounted within said cassette on the take-up spool side of said housing, a stationary metal guide sleeve on said first pin, an electrically conductive plastic guide roller rotatably mounted on said second pin, the magnetic tape path through said cassette housing engaging the back side of said tape against said metal guide sleeve and the magnetic coating side of said tape against said plastic guide roller, and a smooth flat metal member mounted for electrical contact against corresponding ends of said metal sleeve and plastic roller to complete an electrical path therebetween and thereby cancel the electrostatic charges generated on said metal sleeve and the magnetic coating of said tape during transport of said tape between said take-off and take-up spools.

2. A tape cassette in accordance with claim 1, wherein said flat metal member is formed with an arcuate edge compatible with the surface of said first support pin and an aperture for receiving said second support pin therethrough.

3. A tape cassette in accordance with claims 1 or 2, wherein said flat metal member is formed from a metal sufficiently soft to be formed by punching in the substantial absence of burrs but hard enough for retaining shape while being press fitted into position in said housing.

4. A magnetic tape cassette comprising: a housing containing a take-off spool and a take-up spool for magnetic tape, first and second tape guide support pins mounted within said cassette on the take-up spool side of said housing, a stationary metal guide sleeve frictionally restrained on said first pin, an electrically conductive plastic guide roller rotatably mounted on said second pin, the magnetic tape path through said cassette housing engaging the back side of said tape against said metal guide sleeve and the magnetic coating side of said tape against said plastic guide roller, and a smooth flat metal member positioned for electrical contact against corresponding ends of said metal sleeve and plastic roller to complete an electrical path therebetween and thereby cancel the electrostatic charges generated on said metal sleeve and the magnetic coating of said tape during transport of said tape between said take-off and take-up spools, the corresponding end of said metal sleeve frictionally restraining said metal member against said said housing in an orientation for the metal member to serve as a bearing surface for the corresponding end of said plastic roller during rotation thereof.

5. In a magnetic tape cassette, means for electrically interconnecting the magnetic coating side and the reverse side of a magnetic recording tape, said means including a stationary metal guide sleeve mounted on a first pin in said cassette to contact the reverse side of said tape, an electrically conductive plastic guide roller rotatably mounted on a second pin within said cassette for contact with the magnetic coating side of said recording tape, and a smooth metal washer having a concave edge and defining an aperture therethrough, said washer positioned within said cassette with said first pin adjacent said concave edge and said second pin inserted through the aperture of said washer, said washer electrically contacting corresponding ends of said metal guide sleeve and plastic guide roller and serving as a bearing for said plastic guide roller.

* * * * *